United States Patent [19]

Orjela et al.

[11] Patent Number: 4,823,857
[45] Date of Patent: Apr. 25, 1989

[54] TIRE BEADS

[75] Inventors: Gurdev Orjela, Akron; Mahmoud C. Assaad, Uniontown; David B. Beltz, Springfield Township, Clark County; Amit Prakash, Hudson, all of Ohio

[73] Assignee: The Goodyear Tire & Rubber Company, Akron, Ohio

[21] Appl. No.: 168,847

[22] Filed: Mar. 16, 1988

[51] Int. Cl.$^4$ ............................................. B60C 15/04
[52] U.S. Cl. ..................................... 152/540; 245/1.5
[58] Field of Search ............... 152/540, 539, 451, 547; 156/289, 136, 422; 245/1.5; 428/295, 352

[56] References Cited

U.S. PATENT DOCUMENTS

| | | | |
|---|---|---|---|
| 1,681,680 | 8/1928 | Pierce | 245/1.5 |
| 3,237,674 | 3/1966 | Budd et al. | 152/540 |
| 3,356,323 | 12/1967 | Friend | 245/1.5 |
| 3,612,139 | 10/1971 | Marzocchi | 152/540 |
| 3,942,574 | 3/1976 | Bantz | 152/540 |
| 4,075,048 | 2/1978 | Lupton et al. | 156/136 |
| 4,098,316 | 7/1978 | Carvalho et al. | 152/540 |
| 4,202,717 | 5/1980 | Seiberling | 156/136 |
| 4,290,471 | 9/1981 | Pfeiffer | 152/540 |
| 4,320,791 | 3/1982 | Fujii et al. | 152/540 |
| 4,477,301 | 10/1984 | Bouju et al. | 156/136 |
| 4,754,794 | 7/1988 | Bocquet et al. | 152/527 |

FOREIGN PATENT DOCUMENTS 1059821 2/1967 United Kingdom .

OTHER PUBLICATIONS

Webster's New Collegiate Dictionary, Merriam-Webster Co., Springfield, Mass., 1977, pp. 425, 215.

Primary Examiner—Michael W. Ball
Assistant Examiner—Ramon R. Hoch
Attorney, Agent, or Firm—L. R. Drayer

[57] ABSTRACT

Tire bead members (10) have radially superposed layers (11,12,13,14) of fibers (15) embedded in a polymeric matrix (16). Interposed between the layers (11,12,13,14) of composite material are thin layers (17,18,19) of a material that is not adhered to both of the adjacent layers (11,12;12,13;13,14) of composite material. Tires employing said bead members are also disclosed.

18 Claims, 1 Drawing Sheet

TIRE BEADS

The present invention relates to bead members for tires.

The bead member of a tire is the component of the tire which holds the tire on a rim and serves as an anchor for the carcass reinforcing structure of the tire. When assembled into a tire, the bead member must be quite rigid while being flexible enough to allow the tire to be distorted during the manufacturing process and/or mounting of the tire on a rim and demounting of the tire from a rim.

It is a common practice in the tire industry that the reinforcing elements in bead members are steel wires arranged either side-by-side or twisted into cables. The wires or cables are normally embedded in rubber.

Bead members comprising nonmetallic fibers embedded in a matrix, such as an epoxy resin, are described in U.S. Pat. No. 3,237,674, U.S. Pat. No. 4,075,048, U.S. Pat. No. 4,098,316 and U.S. Pat. No. 4,320,791. These prior art composite bead members have radial cross-sections that are solid, that is to say of a substantially homogeneous structure. The designs of the prior art composite bead members do not provide for the strains that are developed in the beads due to changes in the radius of curvature and out of plane bending encountered by tire bead members during the tire manufacturing process and/or mounting of the tire on a rim and demounting of the tire from a rim. Tire bead members according to the present invention are intended to address the aforementioned problems by providing radially superposed layers of composite structures that can move laterally with respect to one another. As used herein and in the claims, a "composite" refers to a structural material composed of a mixture of two or more components that differ in form and/or composition and that are essentially insoluble in each other.

The features of the present invention which are believed to be novel are set forth with particularity in the appended claims. The present invention, both as to its structure and manner of operation, may best be understood by referring to the following detailed description, taken in accordance with the accompanying drawings in which:

Figure 1:
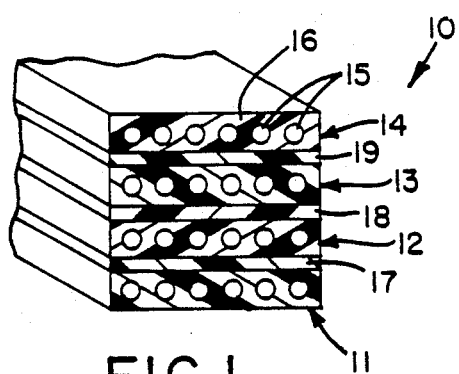
FIG. 1 is a sectional view of a bead member according to one embodiment of the invention.

With reference to FIG. 1, an annular bead member 10 for a tire comprises at least two radially superposed layers 11,12,13,14 each of which comprises a composite of fibers 15 embedded in a nonmetallic matrix material 16. Any suitable fiber may be employed, but it is preferred tha the fibers be selected from the group consisting of glass fibers, aramid fibers, carbon fibers, polyamide fibers and metallic fibers. The fibers 15 may be either continuous inasmuch as individual fibers extend circumferentially about the axis of rotation of the bead member, or the fibers may be discontinuous. As used herein and in the claims the terms "fiber" and "fibers" are understood to refer to both individual filaments, flock and associated groups of filaments regardless of whether or not the filaments of an associated group are twisted together with one another. The matrix material 16 may be any suitable polymeric material, and preferably is an epoxy resin. While the number of layers 11,12,13,14 shown in each of the examples illustrated is four, it is understood that the actual number of layers is dependent upon the performance requirements of a tire in which the bead will be employed.

In a bead member according to the invention, each next adjacent pair of radially superposed layers of composite 11,12; 12,13; 13,14 are separated from one another by material 17,18,19 that is not attached to both of the adjacent layers of composite by either adhesive or mechanical bonds. That is to say, the layers of insulating material 17,18,19 which are radially interposed between next adjacent layers of composite 11,12; 12,13; 13,14 may be attached to one of said layers, but not to both of said layers, in order to facilitate lateral movement of the layers of composite with respect to one another. By way of example, tire bead members have been manufactured having polytetrafluoroethylene (marketed under the name Teflon ® by E. I. duPont de Nemours & Co.) disposed between the layers of composite. It is understood however that any other suitable material, for example vulcanized rubber, could be used in place of the polytetrafluoroethylene. Preferably, the thickness of each layer 11,12,13 of composite material, as measured in a radial direction, is less than 2.5 mm, and the material 17,18,19 between the composite layers is much thinner than the adjoining composite layers.

Figure 2:
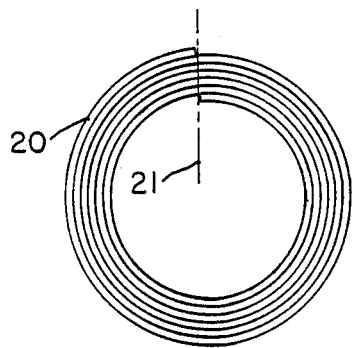
FIG. 2 is a schematic side view illustrating as a single line the convolutions of a spiral disposition of the layers of a bead member according to one aspect of the invention.
Figure 3:
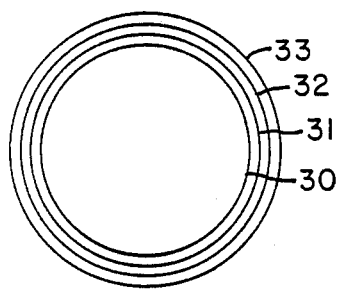
FIG. 3 is a schematic side view illustrating as series of concentric circles the layers of a bead member according to one aspect of the invention.

The layers of composite may be either in the form of a spiral 20, as illustrated in FIG. 2, or in the form of concentric rings 30, as illustrated in FIG. 3. If the composite layers are in the form of a spiral 20, it is preferable that the ends of the composite are located substantially on the same radial plane 21.

By way of example only, bead members according to the invention have been manufactured having four layers of composite material comprising "Scotchply" reinforced plastic type SP-250E which is available from 3M Corporation of St. Paul, Minn., U.S.A. SP-250E is a high strength moldable epoxy "E" glass prepreg designed for low temperature cure cycles. It utilizes Owens Corning 456 glass to obtain high strength and modulus with a cure temperature as low as 121° C. (250° F.). This composite is available in rolls of unidirectional and cross-plied orientation of non-woven glass reinforcement on a release treated liner. Bead members have been manufactured using both unidirectional and cross-plied materials. The thickness of each ply of the prepreg is about 0.22 mm (0.0088 in) and the number of wraps of the prepreg in each of the composite layers could be varied to provide a desired composite layer thickness. About 53% of the volume of the prepreg is fiber. The layers of Teflon ® disposed between layers of composite material each had a total thickness of about 0.05 mm (0.002 in). The bead members manufactured using the described materials were of the concentric ring variety illustrated in FIG. 3.

If desired, a bead member 40 according to the invention may have a radially innermost composite layer 41 that has a convex surface to facilitate the folding of other tire components around the bead member.

A tire engineer may wish to alter the cross-sectional shape of a bead member 50 by having one or more of the radially superposed layers of composite 51,52,53,54 comprise side-by-side bands 52A,52B;53A,53B which are separated from one another by material 57 that does not attach to both of said bands by either adhesive or mechanical bonds.

An engineer may wish to fine tune the physical properties of a bead member by using different fibers and/or matrix materials in the various layers of the composite. Furthermore, the physical properties may be affected by having the fibers in at least two of the layers be discontinuous fibers, and having the angular orientation of the fibers in one of said layers with respect to a plane containing the axis of rotation of the bead member be different from the angular orientation of the discontinuous fibers in the other layer with respect to said plane. For example, the fibers in one layer could be oriented at $+45°$ and in the other layer the fibers could be oriented at $-45°$. Yet another way in which the physical properties of a bead member according to the invention may be tuned is to vary the thickness of the layers of the composite.

Figure 6:
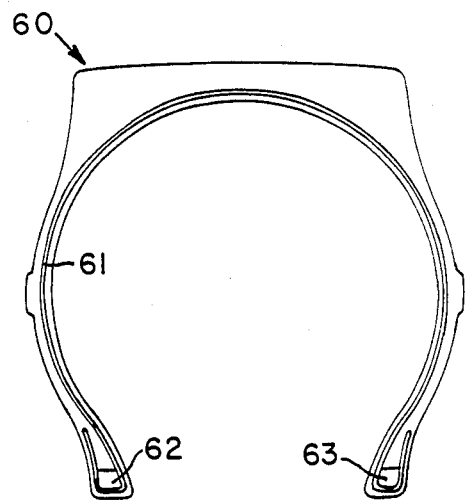
FIG. 6 is a schematic sectional view of a tire incorporating bead members according to the present invention.
Figure 4:
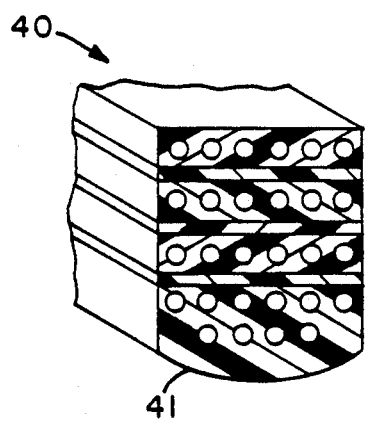
FIGS. 4 and 5 are sectional view of bead members according to alternative embodiments of the invention.
Figure 5:
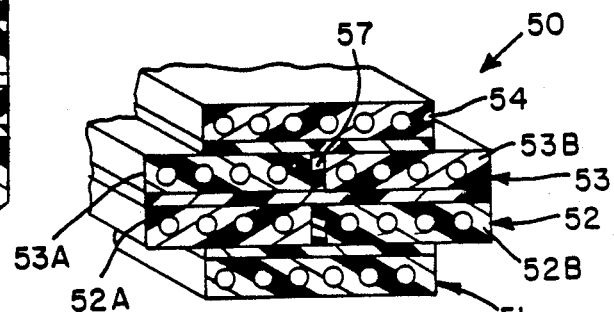

Referring to FIG. 6, there is shown a simple schematic cross-section of a tire 60 having a carcass ply 61 that is anchored about a pair of axially spaced apart annular bead members 62,63 which are in accordance with any of the embodiments described herein.

While certain representative embodiments have been described herein for the purpose of illustrating the invention, it is understood that persons of skill in the applicable arts can make various modifications to these illustrative embodiments without deviating from the scope of the invention.

We claim:

1. An annular bead member for a tire comprising two or more radially superposed layers each of which comprises a composite of fibers embedded in a matrix of a polymeric material, each next adjacent pair of say layers being separated from one another by a layer of polytetrafluoroethylene that is not attached to both of said adjacent layers by either adhesive or mechanical bonds.

2. An annular bead member as claimed in claim 1 wherein said layers are in the form of a spiral.

3. An annular bead member as claimed in claim 1 wherein said layers are in the form of concentric rings.

4. An annular bead member as claimed in claim 1 wherein at least one of said radially superposed layers comprises side-by-side bands of said composite, said side-by-side bands being separated from one another by a layer of polytetrafluoroethylene that is not attached to both of said adjacent bands by either adhesive or mechanical bonds.

5. An annular bead member as claimed in claim 4 wherein said bead member has a cross-sectional shape that is hexagonal-like.

6. An annular bead member as claimed in any of claims 1 to 5 wherein the fibers in said composite are selected from the group consisting of glass fibers, aramid fibers, carbon fibers, polyamide fibers and metallic fibers.

7. An annular bead member as claimed in any of claims 1 to 5 wherein the matrix material of said composite is an epoxy resin.

8. An annular bead member as claimed in claim 6 wherein the matrix material of said composite is an epoxy resin.

9. An annular bead member as claimed in any of claims 1 to 5 wherein the fibers in two of said layers are discontinuous fibers and the angular orientation of the fibers in one of said layers with respect to a plane containing an axis of rotation of the bead member is different from the angular orientation of discontinuous fibers in said other layer with respect to said plane.

10. A tire having an annular bead member comprising two or more radially superposed layers each of which comprises a composite of fibers embedded in a matrix of a polymeric material, each next adjacent pair of said layers being separated from one another by a layer of polytetrafluoroethylene that is not attached to both of said adjacent layers by either adhesive or mechanical bonds.

11. A tire as claimed in claim 10 wherein said composite is in the form of a spirally wound band.

12. A tire as claimed in claim 10 wherein said layers are in the form of concentric rings.

13. A tire as claimed in claim 10 wherein at least one of said radially superposed layers comprises side-by-side bands of said composite, said side-by-side bands being separated from one another by a layer of polytetrafluoroethylene that is not attached to both of said adjacent bands by either adhesive or mechanical bonds.

14. A tire as claimed in claim 13 wherein said bead member has a cross-sectional shape that is hexagonal-like.

15. A tire as claimed in any of claims 10 to 14 wherein the fibers in said composite are selected from the group consisting of glass fibers, aramid fibers, carbon fibers, polyamide fibers and metallic fibers.

16. A tire as claimed in any of claims 10 to 14 wherein the matrix material of said composite is an epoxy resin.

17. A tire as claimed in claim 15 wherein the matrix material of said composite is an epoxy resin.

18. A tire as claimed in any of claims 10 to 14 wherein the fibers in two of said layers are discontinuous fibers and the angular orientation of the fibers in one of said layers with respect to a plane containing an axis of rotation of the bead member is different from the angular orientation of the discontinuous fibers in said other layer with respect to said plane.

* * * * *